(12) United States Patent
Ivanine et al.

(10) Patent No.: US 7,910,056 B2
(45) Date of Patent: Mar. 22, 2011

(54) PORTAL APPARATUS AND METHOD FOR ITS USE

(75) Inventors: Serguei Ivanine, Dee Why (AU); Kenneth George Brash, Wombarra (AU)

(73) Assignee: Asia World Shipping Services Pty Ldt., Artarmon (AU)

( * ) Notice: Subject to any disclaimer, the term of this patent is extended or adjusted under 35 U.S.C. 154(b) by 602 days.

(21) Appl. No.: 11/885,466

(22) PCT Filed: Mar. 1, 2006

(86) PCT No.: PCT/AU2006/000259
§ 371 (c)(1),
(2), (4) Date: Dec. 6, 2007

(87) PCT Pub. No.: WO2006/092008
PCT Pub. Date: Sep. 8, 2006

(65) Prior Publication Data
US 2008/0107563 A1  May 8, 2008

(30) Foreign Application Priority Data

Mar. 1, 2005 (AU) ............................. 2005900953

(51) Int. Cl.
*A61L 9/00* (2006.01)
*A01M 13/00* (2006.01)
(52) U.S. Cl. ............................. 422/32; 422/294; 43/125
(58) Field of Classification Search .................. 422/1, 5, 422/28–30, 32, 37, 40, 123–125, 292, 294, 422/297, 298, 300, 305; 43/125, 129
See application file for complete search history.

(56) References Cited

U.S. PATENT DOCUMENTS

| 90,336 A | 5/1869 | Bellamy |
| 4,200,657 A | 4/1980 | Cook |
| 4,812,291 A | 3/1989 | Friemel et al. |

(Continued)

FOREIGN PATENT DOCUMENTS

DE  4205459 A1  8/1993

(Continued)

OTHER PUBLICATIONS

International Search Report for International Application No. PCT/AU2006/000259, dated May 26, 2006.
Examination Report for New Zealand Patent Application No. 585896 dated Jun. 11, 2010.

*Primary Examiner* — Walter D Griffin
*Assistant Examiner* — Timothy Cleveland
(74) *Attorney, Agent, or Firm* — Harness, Dickey & Pierce, P.L.C.

(57) ABSTRACT

A portal apparatus in the form of an arch-shaped pipe fitting (10) for use with a fumigation chamber that in part incorporates a flexible canopy. The pipe fitting (10) can be seated on the ground (12) so as to be positioned between the canopy and the ground (12). A sealing surface (22) on the pipe fitting (10) is contactable with the flexible canopy so as to provide a gas-tight seal. An assembly for directing the flow of gas in general, the assembly being operable in various configurations, and comprising first and second gas inlets and outlets respectively. An assembly for operatively coupling gas extraction, treatment and recirculation apparatus, and comprising first and second gas inlets and outlets respectively that can be selectively coupled in first and second configurations. A method of fumigating a product in a fumigation chamber, and comprising the operative coupling of fumigant introduction, extraction, absorption and recirculation apparatus in a stepwise fashion, thus enabling fumigant to recirculate during fumigation while, at the conclusion of fumigation, allowing the gas carrying the fumigant to recirculate while fumigant is absorbed. A method of fumigating a product in a fumigation chamber, and comprising the steps of providing an inlet and outlet port, providing fumigant via the inlet port, controlling a flow of displacement gas to selected parts of the chamber and extracting the fumigant.

21 Claims, 9 Drawing Sheets

| U.S. PATENT DOCUMENTS | | | | FOREIGN PATENT DOCUMENTS | | |
|---|---|---|---|---|---|---|
| 4,966,755 A | 10/1990 | Smith | DE | 10314881 A1 | 5/2004 |
| 5,417,921 A | 5/1995 | Dove et al. | EP | 0068724 | 1/1983 |
| 5,641,463 A | 6/1997 | Langhart | FR | 2487638 A1 | 2/1982 |
| 5,755,527 A | 5/1998 | Dufresne | JP | 3111286 | 5/1991 |
| 5,785,086 A | 7/1998 | Boyce et al. | JP | 4203599 | 7/1992 |
| 6,202,565 B1 | 3/2001 | Henry | JP | 6281075 | 10/1994 |
| 6,252,164 B1 | 6/2001 | Wise | JP | 10156139 | 6/1998 |
| 6,513,282 B2 | 2/2003 | Schott et al. | JP | 11169053 | 6/1999 |

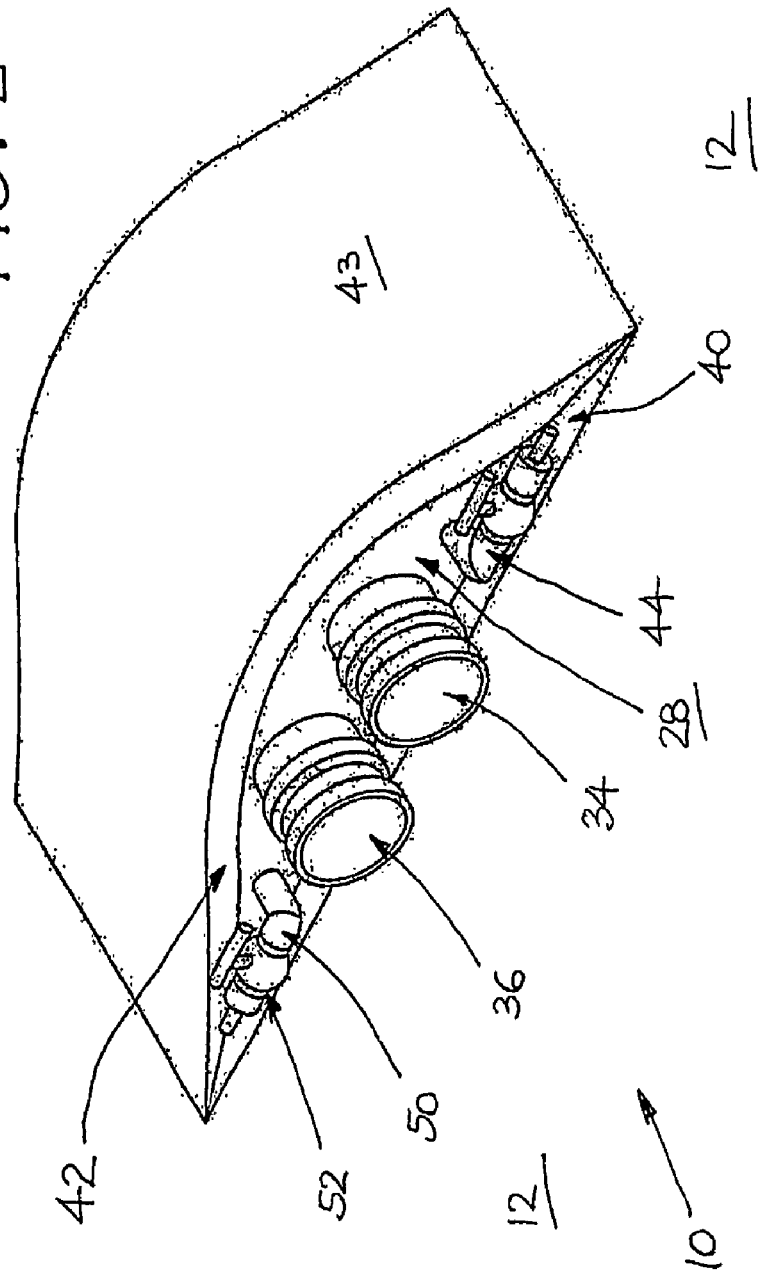

PORTAL APPARATUS AND METHOD FOR ITS USE

FIELD OF THE INVENTION

The present invention relates generally to fumigation apparatus. The invention can be used in the fumigation of any type of bulk material or product which may contain pests, insects or other vermin and which therefore requires fumigation.

BACKGROUND TO THE INVENTION

Many bulk material products such as grains or other agricultural products contain pests, parasites, insects or other vermin, such as for example borers, lice, ticks, fleas or termites. It is convenient to fumigate such bulk materials in situ so that multiple handling in a further treatment process is not required and before the goods leave their geographic region of origin to prevent the spread of insects and vermin.

Fumigation devices for bulk materials are known in the art that involve placement of a heavy, impervious blanket or other covering article over the materials followed by subsequent addition of toxic gas flow under the blanket to fumigate the covered goods. In some applications a fumigation chamber can be developed using a flexible canopy or blanket supported by a frame structure. Current methods of fumigation under blankets are crude, ineffective at fully eliminating insect infestation since no mixing of gases with bulk materials can occur, and highly dangerous from an occupational health standpoint since the gases used for effective fumigation are extremely toxic. Subsequent atmospheric discharges of fumigant gases, for example methyl bromide, are highly undesirable also because this gas is an ozone depleting substance.

SUMMARY OF THE INVENTION

In a first aspect the present invention provides a portal apparatus for use with a fumigation chamber which at least in part incorporates a flexible canopy, the portal apparatus adapted to be seated on an underlying structure and arranged to be positioned between the canopy and the underlying structure, the apparatus comprising:

a barrier having an enlarged central portion such that the barrier reduces in height moving from the central portion to one of opposite edge portions;

at least one of a fumigant gas inlet or outlet disposed in the barrier, the inlet to allow a flow of a fumigant into the fumigation chamber and the outlet to allow the removal of a flow of fumigant from the fumigation chamber; and a sealing surface extending along an outer periphery of the barrier between said opposite edge portions, the sealing surface adapted to be contactable with the flexible canopy to provide a gas-tight seal between said apparatus and said canopy.

Provision of a gas-tight seal reduces the risk that toxic gases from the fumigation process in the fumigation chamber will pose any occupational health risk to operators of the fumigation apparatus during processing, while they may be standing alongside the portal apparatus.

In one form, the sealing surface can have outer margins arranged to join the underlying structure to form a smooth transition region between said sealing surface and the underlying structure to allow formation of a gas tight seal by the flexible canopy at said transition region(s).

The sealing surface can be generally arch-shaped. In some embodiments, the outer margins of the arch-shaped surface are tapered or curved asymptotic with the underlying surface at the smooth transition region.

The sealing surface can be arranged to accommodate one or more weights thereon to retain the flexible canopy in contact with the sealing surface. The sealing surface may be generally planar. The sealing surface can be arranged to accommodate one or more elongate flexible weights.

In some embodiments, the barrier can be of a segment shape when viewed in elevation.

In some embodiments, the portal apparatus can further comprise an outer portion having an outer surface that incorporates, or supports, the sealing surface and an inner surface, and wherein the barrier comprises at least one panel that depends from the inner surface of the outer portion.

In one embodiment, the barrier can comprise a plurality of panels that are spaced-apart along the inner surface of the outer portion.

The or each panel can have a projection arranged to support the panel on the underlying surface.

In one embodiment, the portal apparatus can comprise a base disposed under the barrier, the base being formed from a deformable material and arranged to assist with the provision of a gas-tight seal between the barrier and the underlying surface.

In one embodiment of the portal apparatus, the sealing surface can be deformable to assist with the provision of a gas-tight seal between the portal apparatus and the flexible canopy.

In another embodiment of the portal apparatus, a sheet of deformable material can be disposed on the outer portion, and an exposed surface of said sheet can form the sealing surface of the apparatus.

In these embodiments mentioned above, the deformable material used can be a compressible layer of foam.

In some embodiments, the barrier can include one or more further fumigant inlets or outlets. In some forms, the fumigant inlet(s) or outlet(s) comprise(s) a pipe which passes entirely through the barrier to allow fluid communication between either side of the barrier.

In a second aspect the present invention provides a fumigation assembly including the apparatus of the first aspect and a fumigation chamber incorporating at least in part a flexible canopy. In some embodiments, the fumigation assembly can be entirely defined by a flexible canopy, whereas in other embodiments, the assembly can comprise a silo, shed, warehouse or the like which has a wall portion which at least partly comprises a flexible canopy.

In a third aspect the present invention provides a method of installing a fumigant gas port in a fumigation chamber which at least in part incorporates a flexible canopy, the method comprising the steps of:

disposing a portal apparatus according to the first aspect between the flexible canopy and the underlying structure; and retaining a lower edge margin of the flexible canopy in contact with the sealing surface of the portal apparatus to form a gas tight-seal therebetween.

In one form, the method can further comprise the step of locating weights on the lower edge margin of the canopy to retain that edge margin in contact with the sealing surface. As an alternative to weights, adhesives, clips, ties or other types of fasteners may be used for this purpose.

In another form, the method can further comprise the steps of:

providing a smooth transition region between opposite sides of the portal apparatus and the underlying structure; and retaining the lower edge margin of the canopy in contact with the transition region to cause a gas-tight seal across that transition region.

In that form, the method can further comprise the steps of:

locating weights on the lower edge margin of the canopy to retain that lower edge margin in contact with the transition region. As an alternative to weights, adhesives, clips, ties or other types of fasteners may be used for this purpose.

In a fourth aspect the present invention provides a method of fumigating a product located in a fumigation chamber, the method including the steps of:

providing an inlet and outlet port in the fumigation chamber, wherein at least one of said ports is installed using a method according to the third aspect;

operatively coupling fumigant introduction and extraction apparatus to the portal apparatus;

fumigating the product by providing a flow of a fumigant to the fumigation chamber via the inlet port; and extracting a flow of the fumigant from the fumigation chamber via the outlet port.

In one embodiment, the method further comprises the steps of:

providing control apparatus for at least one of the fumigant introduction and extraction apparatus; and controlling at least one of the flow of fumigant introduced into, or extracted from, the port(s) under operation of the control apparatus. In one form of this method, the control apparatus used can be a valve assembly.

In one embodiment, the method can further comprise the step of supplying a flow of fumigant in direct association with a heating source, the latter used to convert the fumigant into a gaseous form. In one form, the heating source used can be located inside the fumigation chamber in use. The heat energy transferred to the fumigant assists it to become more buoyant than ambient air.

In some embodiments of the method, the source used for the flow of fumigant is a mobile source of the fumigant such as a motor vehicle on which a fumigant vessel is mounted.

In one embodiment, the method can further comprise the step of dispersing the fumigant in the fumigation chamber. In one form the fumigant can be dispersed in the fumigation chamber by a dispersion pipe system in use located around the product to circulate fumigant and gases. Such an arrangement allows more even and thorough dispersion of the fumigant and gases as they enter and are dispersed in the fumigation chamber.

In one embodiment, the step of extracting the flow of fumigant can be accomplished by use of a contra-rotating fan.

In one embodiment of the method of fumigating a product, the step of extracting the flow of fumigant can be followed by the step of producing a stripped gas by absorbing the fumigant using an absorption apparatus operatively coupled to the extraction apparatus, the absorption apparatus being designed to absorb substantially all of the fumigant extracted from the fumigation chamber. In one form, the absorption apparatus can comprise an absorption bed including activated carbon to which at least part of the extracted fumigant attaches.

Advantageously such a fumigant absorption step prevents fumigant or fumigant by-products to escape to atmosphere.

In one embodiment, the method of fumigating a product can further comprise the step of providing a flow of the stripped gas into the fumigation chamber. In one arrangement, the stripped gas can flow into the fumigation chamber via the portal apparatus, although in other arrangements the stripped gas can flow into the chamber via a hose located under another portion of the flexible canopy, for example.

In one embodiment, the method of fumigating a product can further comprise the step of controlling a flow of an inlet gas to selected parts of the fumigation chamber. In one form of this, the inlet gas may be either the fumigant or a displacement gas. The displacement gas can be stripped gas.

In one form, the step of controlling the flow is by the operation of a flow control apparatus comprising a manifold and a valve assembly. In one arrangement, the manifold can have a plurality of outlets and the valve assembly may be arranged to control the flow through at least one of the outlets. In other arrangements, each outlet may have a respective valve assembly fitted thereto.

In one embodiment, the method can further comprise the step of using a monitoring apparatus to monitor the concentration of fumigant in the fumigation chamber. In one form, the monitoring apparatus can comprise a fumigant sampling and detection meter unit operatively coupled to an outlet of the portal apparatus.

In a fifth aspect the present invention provides an assembly for directing the flow of a gas, the assembly operable in a first configuration to receive a flow of a gas via a first inlet and to direct the return of that flow of gas via a first outlet, and in a second configuration to receive a flow of a gas into the first inlet, to pass that flow via a second outlet to a gas treatment apparatus from which the gas then flows back to the assembly via a second inlet, the gas then being returned via the first outlet, wherein the first and second inlets and first and second outlets are arranged in fluid communication in a single structure.

In one form of the assembly, in the first configuration the flow passes from the first inlet to the first outlet via a single flow restriction device, and in the second configuration the flow passes from the first inlet to the first outlet via two flow restriction devices, each flow restriction device being part of the assembly.

In a sixth aspect, the present invention provides an assembly arranged to operatively couple each of a gas extraction, treatment and recirculation apparatus in selective fluid communication, the assembly comprising:

in a first configuration, a first inlet arranged for receiving a flow of gas from a gas source via gas extraction apparatus; and a first outlet arranged for recirculating the flow of extracted gas from the first inlet to the gas source via gas recirculation apparatus; and in a second configuration, a second outlet arranged for passing the flow of gas from the first inlet to treatment apparatus; and a second inlet arranged for receiving the flow of gas from the treatment apparatus and for passing the flow of gas to the first outlet;

wherein the first inlet and the second outlet, the second inlet and the first outlet, and the first inlet and the first outlet are respectively separated by a second, third and first flow restriction device and wherein in the first configuration where there is only gas extraction and recirculation, the second and third flow restriction devices both remain closed and the first flow restriction device alone remains open, and in the second configuration where there is gas extraction, treatment and recirculation, only the second and third flow restriction devices both remain open.

In one form, the assembly is a valve assembly comprising two T-junction sections of pipe joined by the first flow restriction device at a stem portion of each T-junction section, and wherein one side arm of each T-junction section is joined to either the second or third flow restriction devices.

In some embodiments, the flow restriction devices are each butterfly valves.

In a seventh aspect the present invention provides a method of fumigating a product in a fumigation chamber, the method comprising the steps of:
    operatively coupling fumigant introduction, extraction and recirculation apparatus to the fumigation chamber;
    introducing a source of a fumigant into the fumigation chamber using the fumigant introduction apparatus;
    extracting a flow of the fumigant from the fumigation chamber via an outlet using the fumigant extraction apparatus;
    recirculating said flow of extracted fumigant to the fumigation chamber via an inlet using the recirculation apparatus; and
    at the conclusion of a fumigation interval:
    preventing further introduction of fumigant into the fumigation chamber;
    providing a fumigation absorption apparatus which is operatively coupled to the fumigant extraction apparatus;
    directing a flow of fumigant from the fumigant extraction apparatus to the fumigation absorption apparatus; and
    recirculating a flow of gas from the fumigant absorption apparatus to the fumigation chamber using the recirculation apparatus until a predetermined amount of fumigant has been absorbed from the fumigation chamber.

In one form of the method, the fumigant is introduced continuously into the fumigation chamber during the fumigation interval.

In some embodiments of the method of the seventh aspect, at least one of the inlet and outlet can be installed in the fumigation chamber using a method as claimed in the third aspect.

Some embodiments of the method of the seventh aspect utilise the assembly as defined in any one of the fifth or sixth aspects.

In either the fourth or the seventh aspects, the method can further comprise washing at least part of the absorption apparatus to decompose and/or remove the absorbed fumigant. In one example, the absorption apparatus can be washed with a scrubbing solution such as sodium thiosulphate, to yield one or more salts, for instance bromide and sodium methylthiosulphate, from the decomposition of methyl bromide.

In an eighth aspect, the present invention provides a method of fumigating a product located in a fumigation chamber, the method comprising the steps of:
    providing an inlet and outlet port in the fumigation chamber;
    fumigating the product by providing a flow of a fumigant to the fumigation chamber via the inlet port;
    controlling a flow of a displacement gas to selected parts of the fumigation chamber to displace the fumigant; and
    extracting the fumigant from the fumigation chamber via the outlet port.

Some embodiments of the method of the eighth aspect can also have the step of controlling the flow of displacement gas as defined in the fourth aspect.

In some embodiments of the method of the eighth aspect, at least one of said ports is installed using a method according to the method of the third aspect.

BRIEF DESCRIPTION OF THE DRAWINGS

Notwithstanding any other forms which may fall within its scope, preferred forms of the invention will now be described, by way of example only, with reference to the accompanying drawings in which:
FIG. 2 shows a further perspective view of the apparatus shown in FIG. 1, the apparatus fitted with an external layer of a deformable material.

MODES FOR CARRYING OUT THE INVENTION

Figure 1:
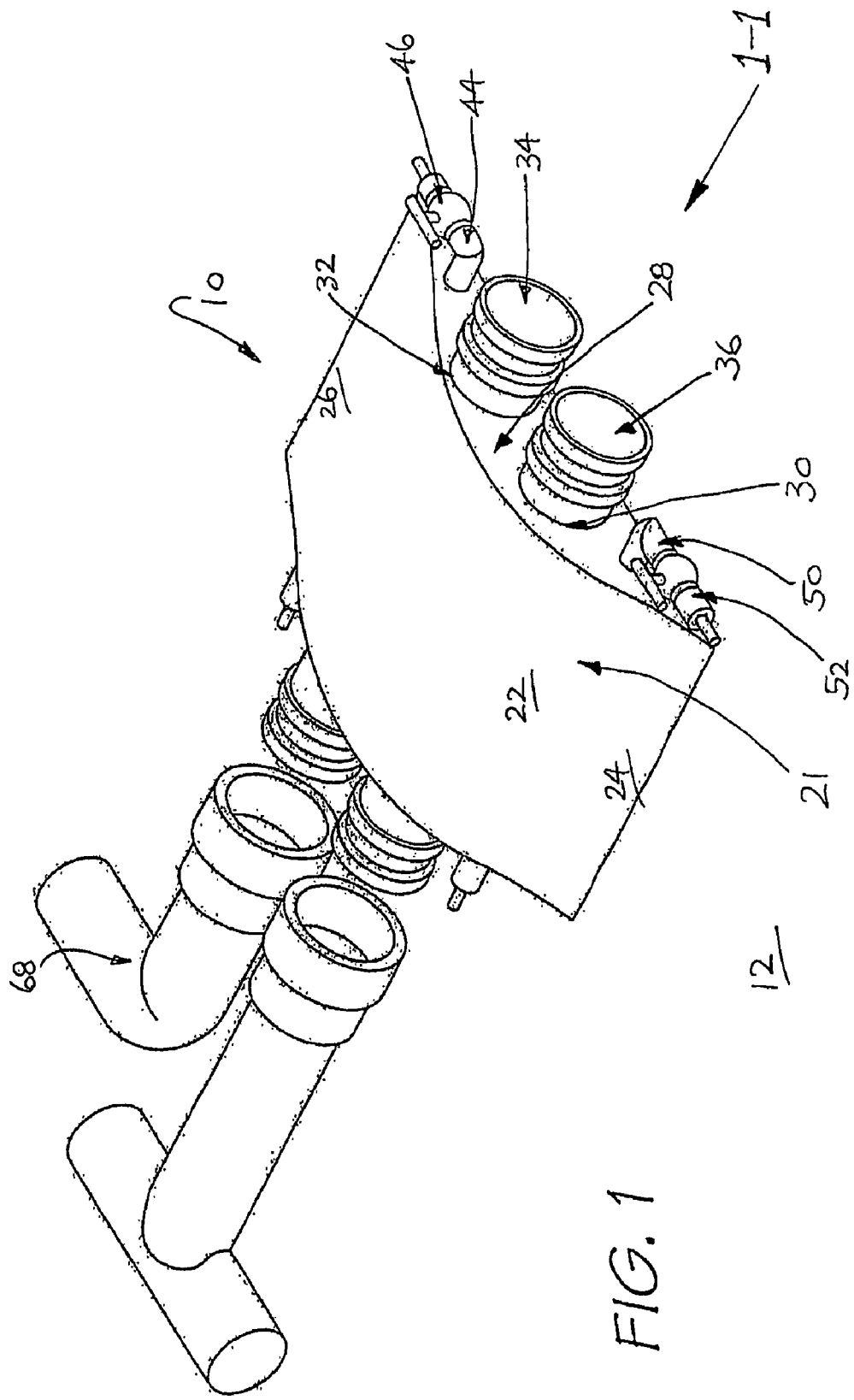
FIG. 1 shows a left, top, perspective view of a portal apparatus in accordance with one embodiment of the present invention, the portal apparatus shown together with various additional valve and pipe fittings for use therewith.
Figure 1A:
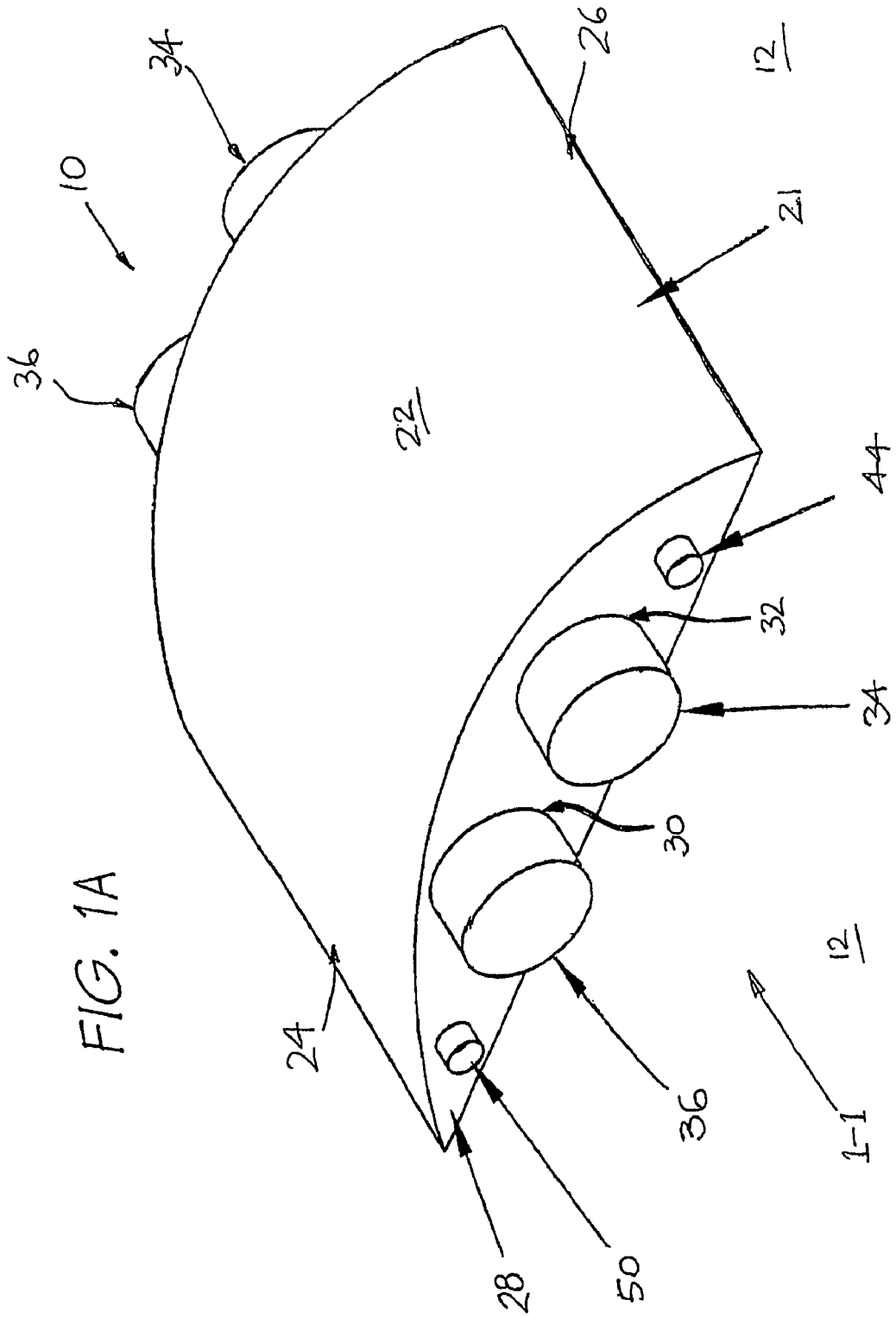
FIG. 1A shows a right, top, perspective view of the portal apparatus of FIG. 1.

Referring to the drawings, a portal apparatus is shown in FIG. 1 and FIG. 1A the form of an arch-shaped pipe fitting 10 which is positioned on an underlying surface in the form of the surrounding ground 12. When in use the pipe fitting 10 is attached to a flexible canopy side 14 of a fumigation chamber, which in the embodiment shown is in the form of a flexible canopy tent 16 which is also placed on the surrounding ground 12. The use of flexible canopy tents for fumigation of goods is useful for enclosing goods of an unusual shape or size, for example goods on pallets, and even whole shipping containers with openable end doors. To form a gas-tight fumigation chamber, the sides 14 of the flexible canopy tent 16 are each normally engaged with the surrounding ground 12 by the placement of weights in the form of so-called "sand snakes" 18 located along the lowermost perimeter region 20 of the flexible canopy sides 14. The sand snakes 18 are tubes filled with a relatively heavy material such as beach sand, and which are elongate and deformable.

The pipe fitting 10 has a planar portion 21 which is curved upwardly (convexly) from the surrounding ground 12 into an arch shape and which has a surface face 22. In use, this surface face 22 is sealingly contacted with the flexible canopy side 14 by the placement of a number of sand snakes 18 along the lowermost perimeter region 20 of the flexible canopy side 14, which can be lapped over a few times and the sand snakes 18 rested thereontop. The sand snakes are able to be bent to mimic the shape of the curved planar portion 21 of the pipe fitting 10. In this way, the seal between the flexible canopy side 14 and the uppermost surface face 22 of the pipe fitting 10 can be gas-tight so that gases within the fumigation tent 16 cannot escape when the pipe fitting 10 is placed on the surrounding ground 12 and under a lower edge of the flexible canopy side 14 in use.

When the term "gas tight" is used in the context of this specification it includes within its scope a sealing arrangement that provides the retention of the substantial quantity of fumigant within the fumigation chamber, but with an understanding that the sealing arrangement may allow egress of some minimal amounts of fumigant gas, the egress of small amounts of fumigant being typically below the occupational health and/or environmental discharge limits of the particular country in which the invention is being practiced.

The pipe fitting 10 shown in the drawings is generally of an arch-shaped profile when viewed from the front, as shown in the direction of arrow 1-1. The curved planar portion 21 and the uppermost surface face 22 extend to opposite edge regions 24, 26 of the pipe fitting 10 where these edge regions 24, 26 are shaped to form a smooth transition between the surface face 22 and the surrounding ground 12. In the embodiment shown, the edge regions 24, 26 of the curved planar portion 21 are tapered so that the smooth transition region has the general appearance of being contiguous with the surrounding ground 12. The tapering can be of a curved shape that is asymptotic with the surrounding ground 12. Such a smooth transition further facilitates the formation of a gas tight seal between the flexible canopy side 14 and the pipe fitting 10 when sand snakes 18 are placed thereacross.

Figure 3:
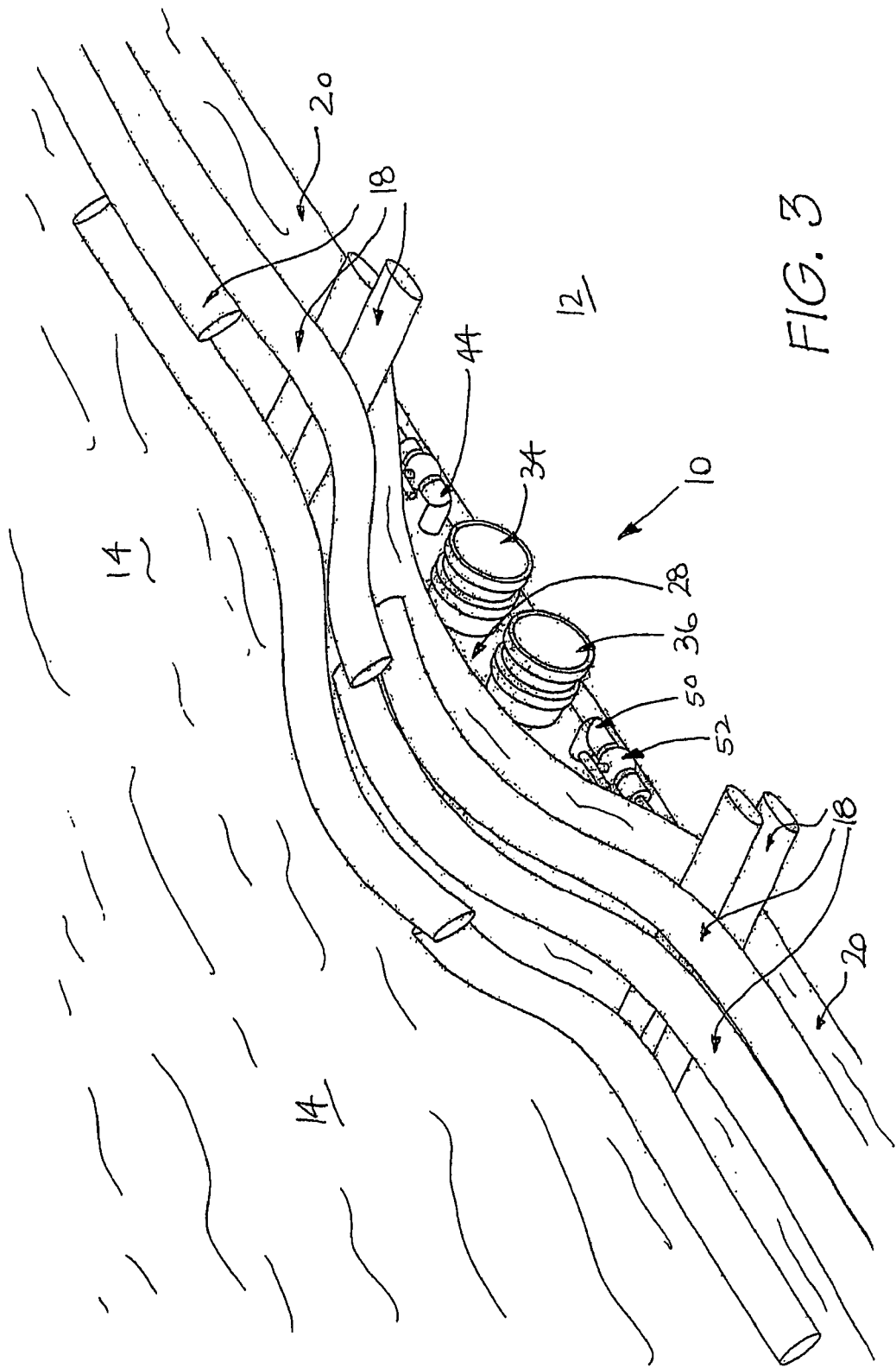
FIG. 3 shows a further perspective view of the apparatus shown in FIG. 1 during use, the apparatus engaged in use with a flexible canopy.

The curved planar portion 21 of the pipe fitting 10 is of a general transverse width which is sufficient to stably support one or more sand snakes 18 piled thereat over the surface face 22, as shown in FIG. 3. Joined to and depending from the curved planar portion 21 is a barrier element in the form of a vertically oriented end panel 28 which is generally shaped as a segment (that is, an area bounded by a chord and the arc of a curve subtended by the chord) and located at an outermost facing (front) side of the pipe fitting. The end panel 28 has two holes 30, 32 positioned therein, and into each hole 30, 32 is positioned a pipe 36, 34 respectively. When the pipe fitting 10 is sealed between the lower perimeter region 20 of the flexible canopy side 14 and the surrounding ground 12, these pipes 34, 36 provide fluid communication access into the fumigation tent through the end panel 28. A first pipe 34 is used as a fumigant gas inlet to allow a flow of a mixture of fumigant and other gases into the fumigation tent and the second pipe 36 is used as a fumigant gas outlet to allow the removal of a flow of fumigant and other gases from the fumigation tent.

In the particular embodiment shown in the drawings, the pipe fitting 10 actually has a barrier element which includes a second vertically oriented panel (a back panel 38) which also is generally shaped as a segment, and is alike in appearance with the end panel 28. The second (back) panel 38 is spaced-apart from the first end (front) panel 28 and is located in use facing the interior of the fumigation tent. The back panel 38 also functions to support the generally horizontal orientation of the pipes 34, 36 that are housed by the pipe fitting 10.

The pipe fitting 10 thus has a hollow core which is defined in shape by the curved planar portion 21, the first 28 and second 38 end panels and the surrounding ground 12 located below the pipe fitting 10. Each of the end panels 28, 38 can also be joined to a bottom plate which is arranged to support the end panels 28, 38 and the curved planar portion 21 on the surrounding ground (and thus enclosing the pipe fitting 10 interior entirely), although in other embodiments, the end panels can have feet or a basal wings which projects laterally therefrom to provide stability for the pipe fitting 10 in the upright position.

As shown in FIG. 2, in one arrangement for use, a layer of a deformable material in the form of a compressible foam 40 is attached (for example by gluing) on the lowermost edges of the end panels 28, 38 to assist with the provision of a gas-tight seal between the pipe fitting 10 and the surrounding ground 12. The weight of the pipe fitting 10 compresses the foam layer 40, which can thus accommodate much of any unevenness in the surface of the surrounding ground 12, which may otherwise provide an escape point for fumigant underneath the pipe fitting 10 in use, for example if the pipe fitting 10 is positioned in use on pebbled or rocky ground rather than a smooth concrete or asphalt pad.

A further layer of a deformable material in the form of compressible foam 42 is attached (again, for example, by gluing) onto the uppermost surface face 22 of the pipe fitting 10 to assist with the provision of a gas-tight seal between the between the pipe fitting 10 and the flexible canopy side 14. The weight of the sand snakes 18 can compress this foam 42, which can thus seat the sand snakes 18 more securely and further enhance the stability of the gas-tight seal. In this instance, the gas-tight seal is being provided by the join between the uppermost face 43 of the compressible foam 42 and the flexible side 14.

In further embodiments, the sealing surface of the portal apparatus can be of a different shape and configuration to the arch, for example, as a result of the end panels being non-identical in shape. In further embodiments, the end walls of the portal apparatus may even be generally triangular in shape, and the sealing surface may comprise two flat-plane surfaces extending away from an apex so that the portal apparatus has the general appearance of a triangular prism.

In still further embodiments, the sealing surface can be a layer affixed onto an outer portion of the portal apparatus, which is curved or planar etc, as described. In such an embodiment, the sealing surface layer and the outer portion which supports such a layer can be made of different materials, for example if it is desired that the sealing surface be made of an adhesive material, or a Velcro™ strip sufficient to contact and secure the flexible canopy at the outer portion of the portal apparatus. In instances where sand snakes are not used to retain the flexible canopy at the portal apparatus, such fastening techniques are suitable alternatives, and can be arranged to extend right up to the edge regions (for example, in the pipe fitting 10 of the drawings, extending out to regions 24, 26).

In still further embodiments, the entire sealing surface of the portal apparatus can be made of a flexible, resilient material which can deform sufficiently to securely seat and support the sand snakes or any other types of weights which may be used instead. For example, the sealing surface could be made of a rubber material. Whilst in some arrangements, the end panels can be made of wood, plastic or metal and joined to such a rubber sealing surface, in further embodiments it is envisaged that the entire sealing surface and end panel wall(s) can be made of a semi-rigid and yet resilient rubber material, perhaps even as an entirely integrally-formed article.

In any of these embodiments the end panels can be welded, glued or otherwise attached, or even integrally formed with the outer portion or sealing surface.

In still further embodiments, there need only be a single gas pipe (of a type similar to pipes 34 or 36) provided through the end panel (for example the end panel 28 of the pipe fitting 10), in the circumstance where at least two such portal apparatus are used in conjunction with one another, and located under the flexible canopy side(s) of a fumigation tent 16. In such an arrangement, one portal apparatus can be used to allow a flow of fumigant into the fumigation tent via its single gas (entry)

pipe, and the other, discrete portal apparatus can be used to allow a flow of fumigant from the fumigation tent 16 via its single gas (exit) pipe. In such an arrangement, the two discrete portal apparatus can be spaced apart and, for example, located on opposite sides of the fumigation tent.

The pipe fitting 10 shown in the drawings can have further inlet and outlet pipes in addition to the first 34 and second 36 pipes. In the embodiment shown, a third pipe 44 can be positioned through the pipe fitting 10 to allow the passage of a concentrated flow of fumigant from a fumigant source directly into the fumigation tent 16. In such an arrangement, the fumigant can be delivered from a fumigant source, such as a gas or liquid cylinder or a mobile delivery system (for instance a motor vehicle on which a fumigant source vessel is mounted, possibly with appropriate heating facilities thereat). Alternatively, the fumigant can be introduced via an access point into the first pipe, such as an access line or T-junction. In either instance the fumigant inlet pipe can be fitted with suitable hose couplings or fittings to enable linkage with external sources of fumigant gas, such as the tap and hose fitting shown at item 46.

In the embodiment shown in the drawings, the flow of fumigant in the inlet gas flow (in the first pipe 34) is in direct association with a heating source which is used to heat and convert the fumigant (such as heavier than air gas molecules of methyl bromide, for example) into a gaseous form, or to maintain the fumigant in a gaseous form in a cold operating environment. The heating source is typically a heater 48 which, when in use, is located inside the fumigation tent 16 and connected to a distribution pipe 68. As many heaters are not gas-tight during operation, this arrangement has the advantage that, if any leakage of fumigant occurs from the heater 48, it will only escape into the fumigation tent 16, rather than into the environment outside of the fumigation tent 16. In other embodiments, if a gas-tight heater is available, it may be placed in-line in the fumigant inlet gas flow outside of the fumigation tent.

The pipe fitting 10 can have a further outlet pipes in addition to the second pipe 36. In the embodiment shown in the drawings, a fourth pipe 50 can be positioned through the pipe fitting 10 to allow the passage of a sample of the mixture of fumigant and other gases from the fumigation tent 16 using a monitoring apparatus to monitor the concentration of fumigant in the fumigation tent. In such an instance, the monitoring apparatus can comprise a fumigant sampling and detection meter unit operatively coupled to the fittings 52 located at the outside end of the fourth pipe 50 of the pipe fitting 10. Alternatively, the contents of the gas the fumigation tent 16 can be sampled via an access point in the second pipe 36, such as a side port or T-junction. Such a gas sampling system can draw small amounts of the gaseous contents out of the fumigation tent 16 and deliver a reading on the gas flow meter test unit as to the concentration of fumigant gas remaining in the fumigation tent 16. This monitoring is carried out both to ensure that specific concentrations of fumigant gas have been reached and also to establish when the pipe fitting 10 may be safely disengaged from the fumigation tent 16 for the purposes of removing the fumigated product(s) without occupational health risk exposure to operators or other persons located nearby.

The operation of the pipe fitting 10 in conjunction with the fumigation tent 16 will now be described in more detail with reference to FIGS. 5, 6 and 7. The pipe fitting 10 is placed on the surrounding ground 12 upon which the fumigation tent 16 is also positioned, and the tent 16 is located around the or each item to be fumigated. Non-limiting examples of such items to be fumigated include a row of pallets carrying a bulk cargo (shown generally as item 70 in FIGS. 5 and 6) or a shipping container loaded with produce and with the doors open (shown generally as item 100 in FIG. 7) etc. The pipe fitting 10 is then contacted with and sealed to the flexible canopy side 14 of the fumigation tent 16 by the use of sufficient sand snakes 18 to retain the lowermost perimeter region 20 of the flexible canopy side 14 at the uppermost surface face 22 of the pipe fitting 10. The canopy side 14 may be lapped over a number of times, if necessary. The canopy side 14 can also be retained by sand snakes positioned across the tapered edge regions 24, 26 at the outer margins of the pipe fitting 10 so that the canopy side 14 is also engaged with the surrounding ground 12 in a gas-tight seal.

A fumigant introduction apparatus in the form of an inlet conduit 52, and a fumigant extraction apparatus in the form of an outlet conduit 54 coupled to an extraction fan 56, are then operatively coupled with the inlet pipe 34 and outlet pipe 36 respectively. The extraction fan 56 can be of any suitable type, for instance contra-rotating or centrifugal. The extraction fan 56 is then linked by a further conduit 58 to a valve assembly shown generally as item 60, which is arranged to couple the gas extraction apparatus 54/56 and the inlet conduit 52 with fumigant treatment and recirculation circuits. The valve assembly 60 functions as a control apparatus to control at least one of the flow of fumigant introduced into, or extracted from, the pipe fitting 10. The conduits 52, 54, 58 can be of any type which can convey gases, such as metal or plastic pipes of a fixed shape, or flexible plastic or rubber hoses. Such an arrangement ensures that at all times the availability of fumigation gases is able to be manually controlled which ensures that highly safe operating procedures can be maintained.

Figure 5:
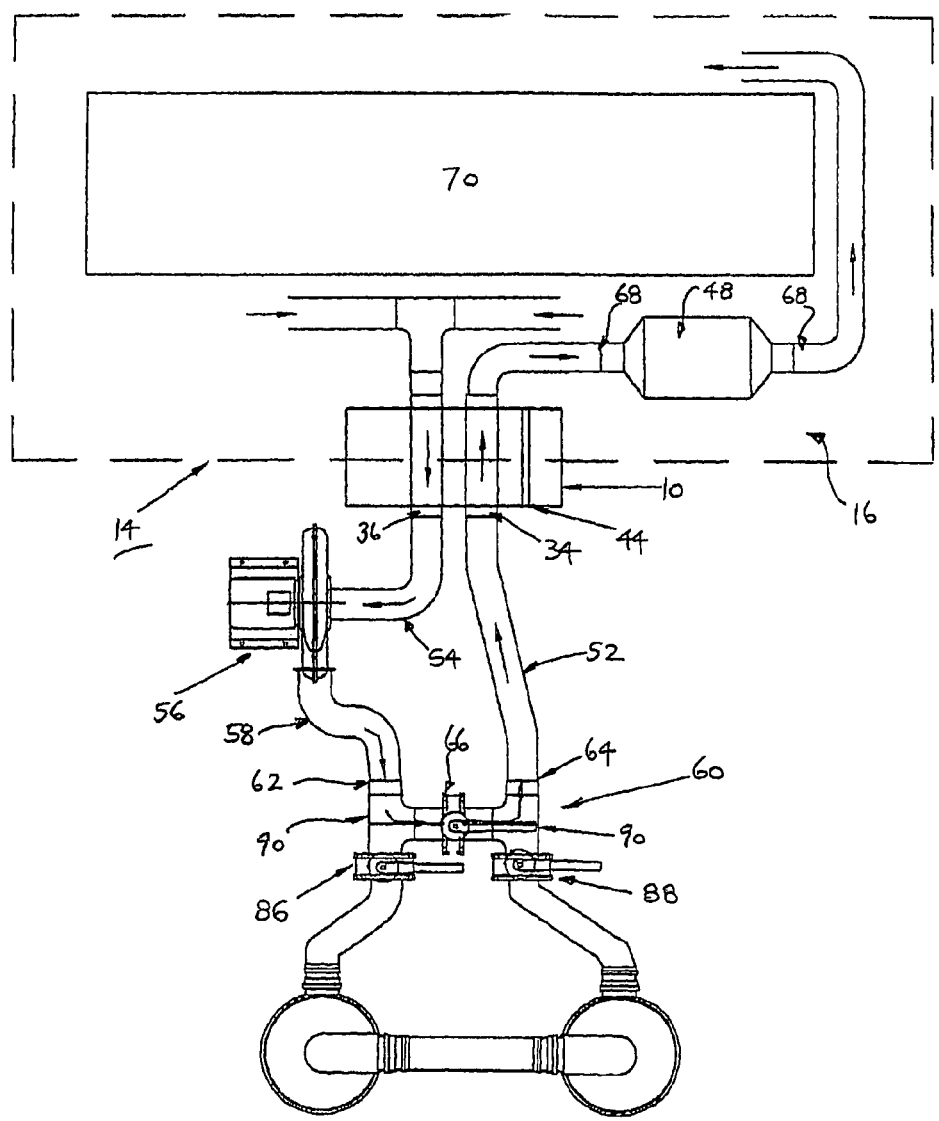
FIG. 5 shows a schematic flow diagram of an apparatus for fumigating a product using a fumigant when in a first configuration, and for absorbing the fumigant when in a second configuration, the apparatus shown in the first configuration only in accordance with one embodiment of the present invention.

In a first operating configuration, as shown in FIG. 5, a first inlet 62 of the valve assembly 60 is coupled to the further conduit 58 and a first outlet 64 of the valve assembly 60 is coupled to the inlet conduit 52. When a first valve 66, which separates the first inlet 62 and outlet 64 of the valve assembly 60, is open and the extraction fan 56 is activated, a flow of gas including fumigant can be moved from the fumigation tent 16 respectively via the outlet pipe 36, outlet conduit 54 and extraction fan 56 and into the valve assembly 60, whereupon the flow of gas can be recirculated to the fumigation tent 16 via the inlet conduit 52 and the inlet pipe 34 respectively.

This first operating configuration shown in FIG. 5 is the flow arrangement for fumigation of the product enclosed in the fumigation tent 16. A source of fumigant can be introduced into this flow arrangement via the aforementioned third pipe 44, if present, or via an access point into the first (inlet) pipe 34. The fumigation tent 16 thus becomes filled with a predetermined amount of fumigant which is continually extracted and recirculated. Additional "make up" fresh fumigant can be added on a continuous or discrete basis. The recirculating flow of fumigant is also able to be heated on a continuous or intermittent basis by the heater 48 which is positioned in line with the inlet pipe 34 on a distribution pipe 68 located inside the fumigation tent 16.

As shown in the drawings, the distribution pipe 68 located in the fumigation tent 16 is arranged to disperse the fumigant in the fumigation tent 16 by being located generally around the product 70. In further embodiments, depending on the product(s) being fumigated, a distribution pipe system can be provided to circulate fumigant and gases, and this pipe system can be of any suitable configuration and arrangement to sufficiently disperse fumigant around the product(s) and to reduce the incidence of the heavier than air fumigant gases from only locating in the lower portion of the fumigation tent. In still further embodiments, various types of recirculation fans can be positioned inside the fumigation tent 16 as an aid to recirculation of the fumigant and gas atmosphere inside the tent 16.

At the conclusion of a pre-determined fumigation interval, the step of extracting the flow of fumigant can be followed by the step of absorbing the fumigant by operatively coupling an absorption apparatus to the extraction apparatus. In this way, the fumigation tent 16 can be safely emptied of fumigant gas prior to being accessed by operators. Furthermore, the absorption of the fumigant prevents its escape into the atmosphere, which is environmentally undesirable.

Figure 6:
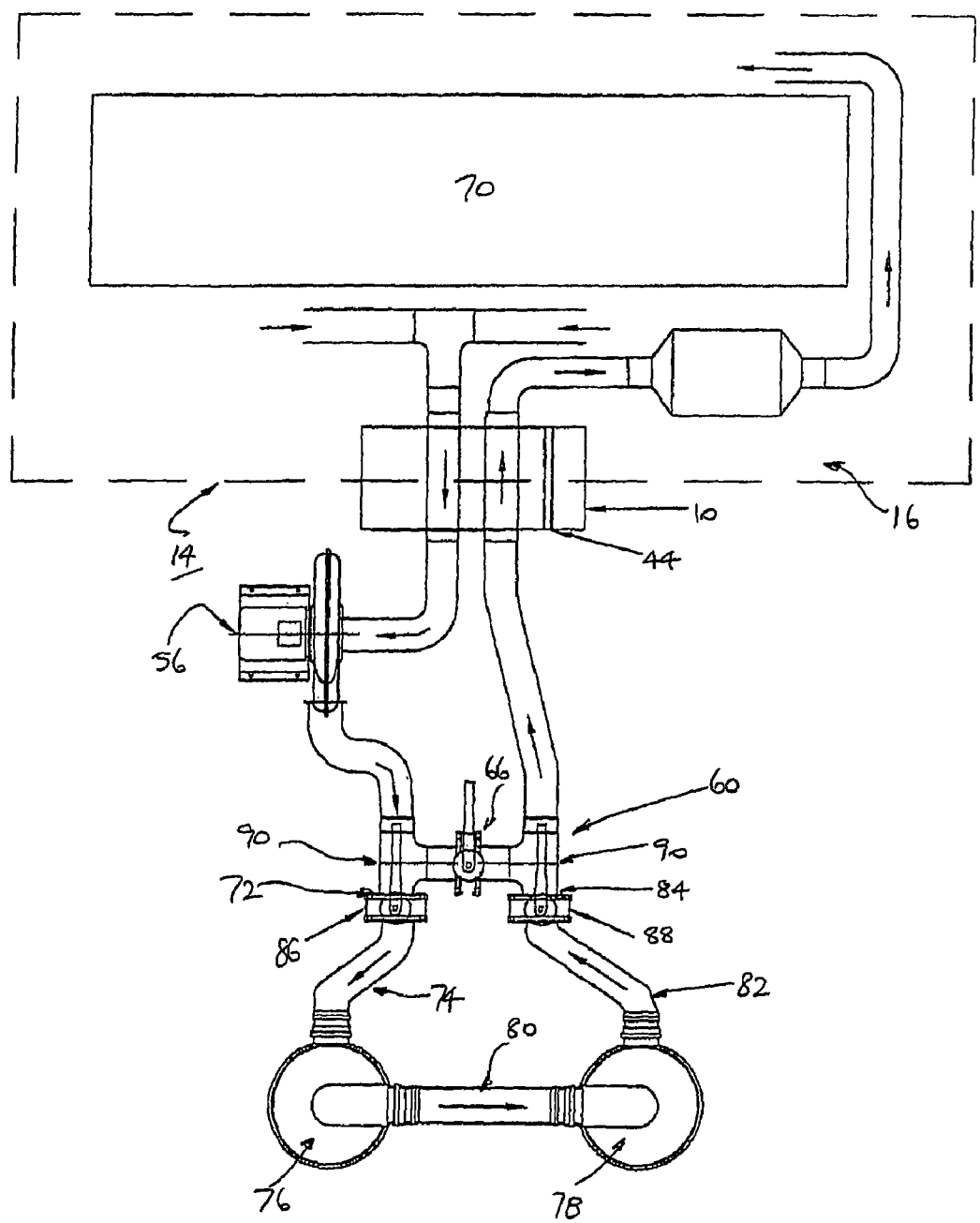
FIG. 6 shows a schematic flow diagram of an apparatus for fumigating a product using a fumigant when in a first configuration, and for absorbing the when fumigant in a second configuration, the apparatus shown in the second configuration only in accordance with one embodiment of the present invention.

A second operating configuration of the valve assembly is shown in FIG. 6 (where in order to avoid repetition, and for ease of reference, similar components and features of this alternative embodiment of the invention have been designated with the same item numbers as shown in FIG. 5). A second outlet 72 of the assembly 60 is connected via a third conduit 74 to a gas absorption apparatus in the form of two sealed filter beds 76, 78 that are connected in series by a fourth conduit 80. In one embodiment, the two filter beds contain activated carbon to which the extracted fumigant (in one example being methyl bromide) attaches, and the filter beds 76, 78 are designed to have the capacity to absorb substantially all of the fumigant gas extracted from the fumigation chamber. The filter beds can be present in a removable cartridge form and the use of a plurality of in-line absorption cartridges is within the scope of the invention.

The second filter bed 78 is connected via a fifth conduit 82 to a second inlet 84 of the valve assembly 60. A second 86 and a third 88 valve are respectively positioned at the second outlet 72 and the second inlet 84 of the valve assembly 60. It is noted that these valves 86, 88 remain closed during the first operating configuration where fumigant gas recirculation only is occurring.

Initially the source of any new fumigant (for example via the third pipe 44) is stopped from flowing into the pipe fitting 10. In the second operating configuration, when the first valve 66 of the valve assembly 60 is closed and the second 86 and third 88 valves are in the open position, and the extraction fan 56 is activated, a flow of gas including fumigant can be moved from the fumigation tent 16 respectively via the outlet pipe 36, outlet conduit 54 and extraction fan 56 and into the valve assembly 60, whereupon the flow of fumigant gas can be treated by flowing respectively via the second valve 86, the third conduit 74, the first filter bed 76, the fourth conduit 80, the second filter bed 78, the fifth conduit 82 and the third valve 88 to return to the assembly 60. At this point, the gas flow, which is now depleted of fumigant, is recirculated back to the fumigation tent 16 via the inlet conduit 52 and the inlet pipe 34 respectively.

This second operating configuration is the flow arrangement for fumigant gas absorption treatment, and the operating flow is maintained until samples of the mixture of fumigant and other gases from the fumigation tent 16, when taken using a monitoring apparatus, indicate that the fumigant gas concentration has fallen to a pre-determined safe level so that the interior of the fumigation tent 16 can be accessed by workers, and the pipe fitting 10 removed.

Figure 7:
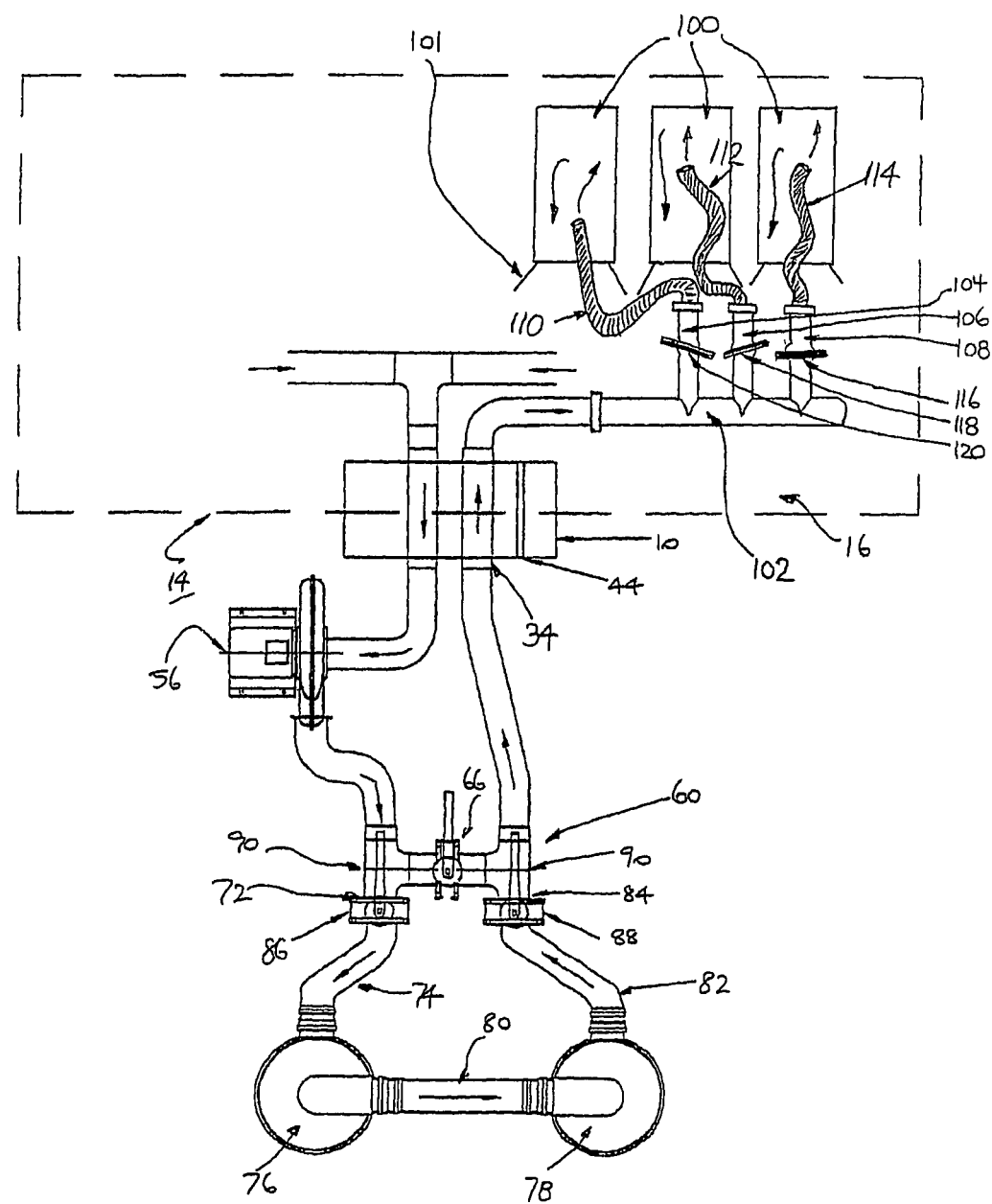
FIG. 7 shows the apparatus of FIG. 6 when used to control a flow of a displacement gas to selected parts of a fumigation chamber using a manifold and valve assembly.
Figure 8:
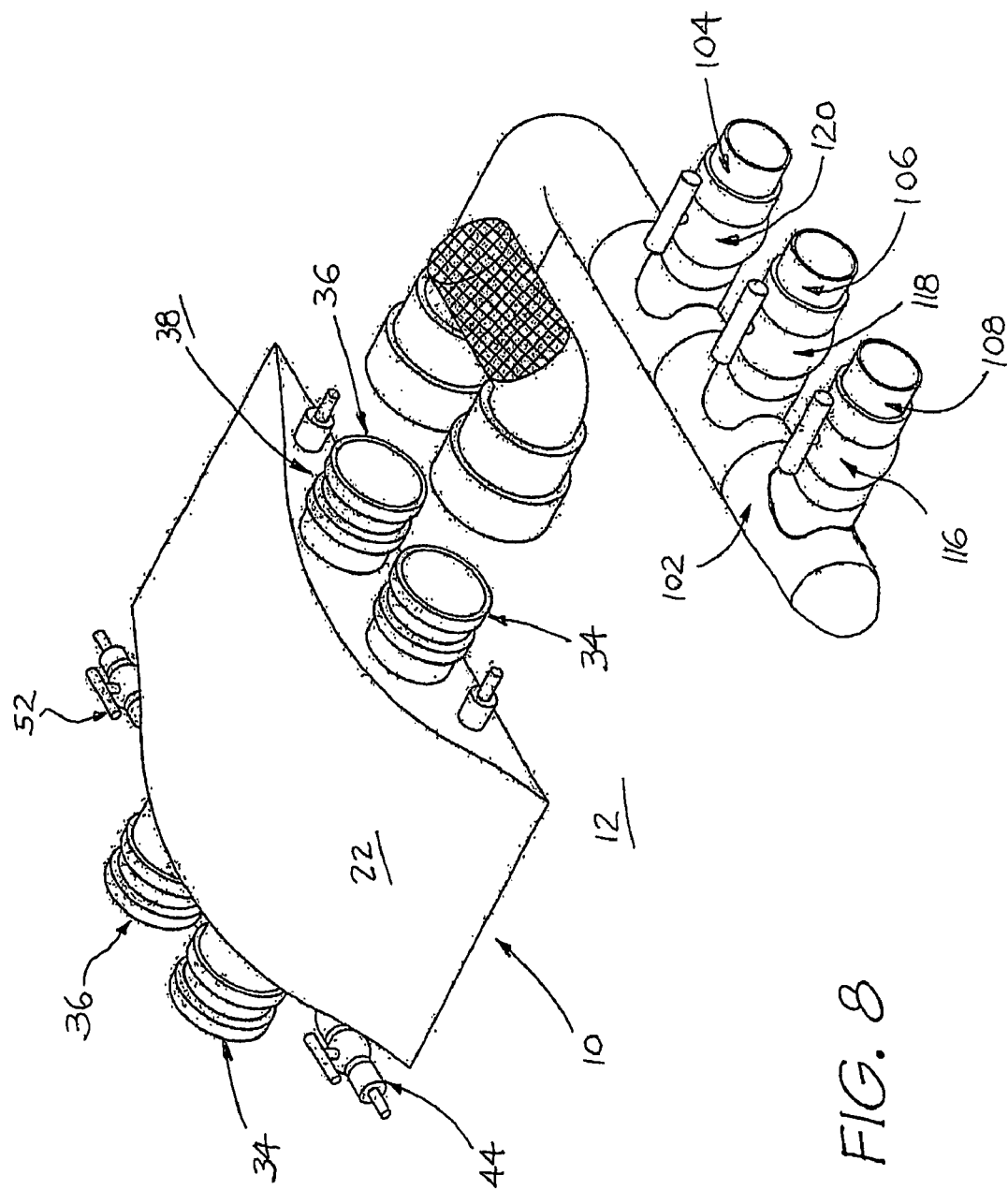
FIG. 8 shows a top, perspective view of the a manifold and a valve assembly of FIG. 7 in accordance with one embodiment of the present invention, the manifold and valve assembly also shown attached to a portal apparatus which is in accordance with one embodiment of the present invention.

A further operating configuration of the apparatus is shown in FIG. 7 (where in order to avoid repetition, and for ease of reference, similar components and features of this alternative embodiment of the invention have been designated with the same item numbers as shown in FIG. 6). In this example the fumigation tent 16 surrounds three shipping containers (shown generally as item 100) which are each loaded with produce. Each of the double end doors 101 of the respective containers 100 are open.

In this configuration, the operation of the fumigation process for fumigation of the shipping containers shown in the tent 16 is no different to that already described for the operating configuration of FIG. 5. Also, the operation of the process for extraction/absorption of the fumigant from the tent 16 is no different to that already described for the operating configuration of FIG. 6. However the manner by which gases are returned to the tent 16 does differ.

Referring to FIG. 7, a return gas flow which has been stripped (or depleted) of fumigant by being passed through the filter beds 76 and 78, is shown being recirculated back to the tent 16 via the inlet pipe 34 of the arch-shaped pipe fitting 10. In other embodiments, the stripped gas can flow back into the fumigation tent 16 via a return hose extending from the assembly 60 and under another side region of the flexible canopy tent 16, for example.

The return flow of the gas which has been stripped of fumigant can advantageously be controlled to selected parts of the fumigation chamber. Referring to FIG. 7, the return flow of gas passes via the inlet pipe 34 into a manifold in the form of a manifold pipe 102 having three outlet pipes 104, 106 and 108. Each of the outlet pipes 104, 106 and 108 is fitted with a respective ball valve 120, 118, 116 to enable selective manual control of the flow of gas therethrough. In further embodiments such control may be automated using a controller and electronic valves etc.

In use, by controlling the flow of a gas which has been stripped of fumigant into selected parts of the fumigation tent 16, an operator can accomplish the displacement of fumigant from regions that are somewhat more difficult to access, both during fumigation and once the fumigation interval is ended. By attaching a length of flexible hose 110, 112, 114 to a respective end of the three outlet pipes 104, 106, 108, the flow of a flushing gas can be directed into the interior of a respective shipping container 100 so as to more effectively displace some fumigant which may remain unrecirculated therein. In other arrangements, different devices, such as nozzles, spargers or perforated pipes can be used to control the flow of gas to any selected part of the interior of the fumigation tent 16 to accomplish a desired outcome. The control of gas flow in such arrangements can be achieved using any type of manual or automated apparatus.

In still further embodiments, the manifold pipe 102 shown can be replaced by another a manifold of any particular shape and configuration, for example with any number and shape of outlet pipes. The flow of gas out of each of the outlet pipes need not be individually selectively controllable.

In still further embodiments, it should also be understood that the source of displacement gas can also comprise at least some ambient air intake to assist with flushing the fumigation tent.

The valve assembly 60 that has been shown in the Figures and described has first 62 and second 84 inlets and first 64 and second 72 outlets that are arranged in fluid communication in a single structure. In one form the structure comprises two like T-junction sections 90 of pipe joined by the first valve 66 at a stem portion of each T-junction section, one side arm of each T-junction section being joined to the second and third valves respectively. The valves can be butterfly valves although other valve types are acceptable.

Figure 4:
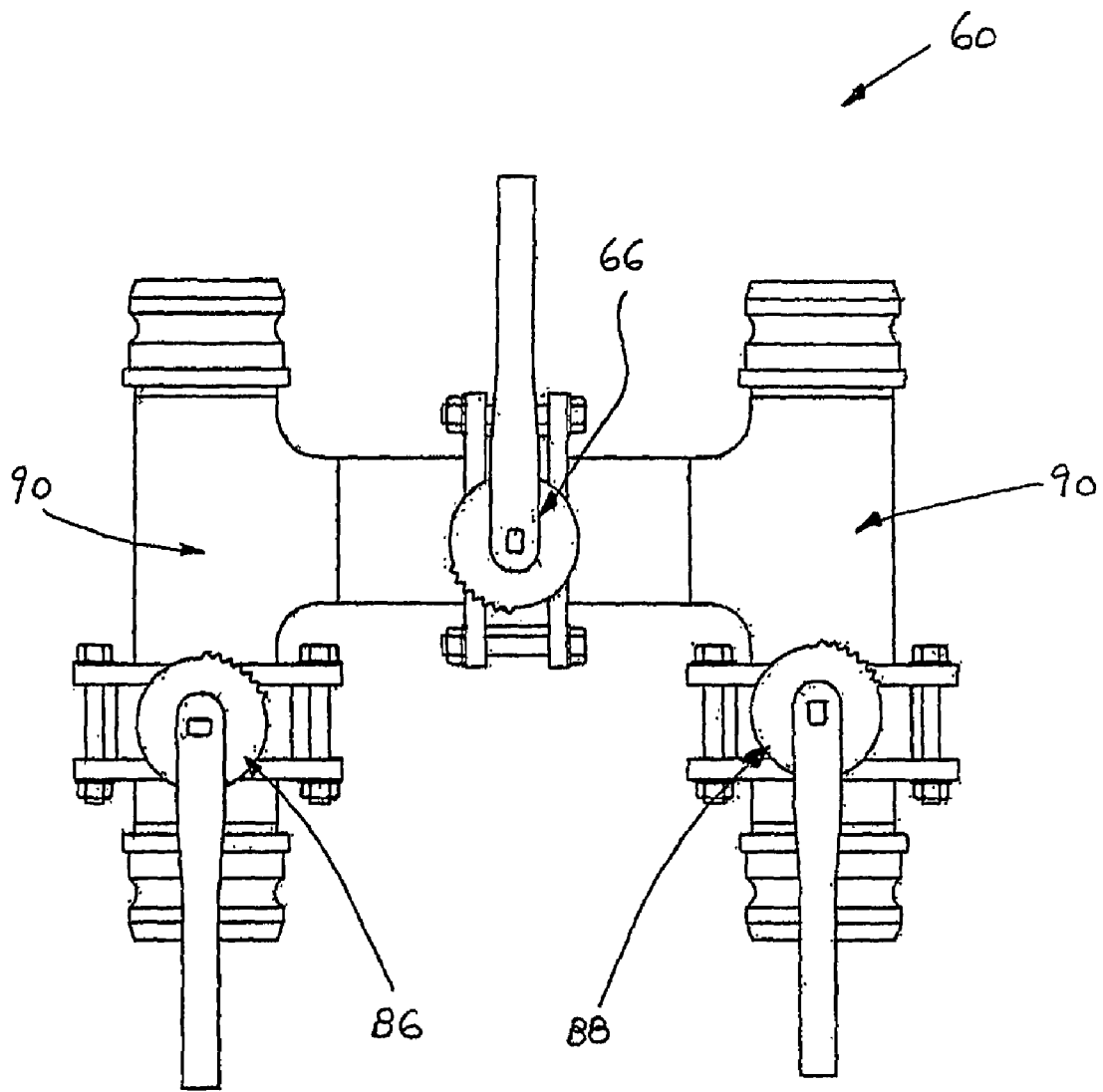
FIG. 4 shows a perspective schematic view of a valve assembly in accordance with one embodiment of the invention.

In further embodiments, the structure of the valve assembly can be formed using non-alike sections, and other ways of joining those sections can be used. FIG. 4 shows T-junction sections joined by nuts and bolts passed through holes located in opposing flanges, although this is only one method of joining such sections, others including screw threaded fittings, friction fit components etc. Indeed the valve assembly can be cast as a single component in some embodiments. The valve assembly can be configured into other shapes and there is no requirement for the general "H" shape shown in the embodiment of FIG. 4.

A fumigant gas, such as methyl bromide, attaches to the activated carbon of the absorption bed cartridge, and the carbon can be periodically removed and washed with a scrubbing solution, such as sodium thiosulphate to degrade the fumigant. For instance, scrubbing of contents of the absorption bed cartridge with sodium thiosulphate yields bromide and sodium methylthiosulphate which are non-toxic salts which can be discharged safely to the environment.

In further embodiments of the invention, the fumigant gas used can be of different types, depending on the fumigation situation. For example, it is within the scope of the invention for gases such as other alkyl halides (besides methyl bromide), phosphine, sulfural fluoride or carbon dioxide to be used in the fumigation method. In the case of phosphine, passing the gas through an absorption cartridge of wet carbon causes the gas to be converted to form phosphoric salts on the outside surface of the carbon; these salts can be subsequently washed away from the carbon. In the case of sulfural fluoride, passing the gas through an absorption cartridge containing calcium carbonate causes the gas to be converted to form various sulfur salts which again can be safely disposed of. If carbon dioxide is used as a fumigant to suffocate pests etc, it may simply be removed from the fumigation chamber by bubbling into a vessel or cartridge containing water to form carbonic acid, and subsequently discarded.

The present invention teaches the use and then the subsequent removal of the fumigant gases by extraction from the fumigation chamber followed by chemical absorption of that fumigant so that substantially no fumigant (or fumigant by-product) is expelled to the atmosphere. There are significant environmental and occupational health reasons for this further gas processing so that a fumigation process such as the one described may be operated safely in the vicinity of people or animals or generally in urban areas. The secure attachment of the flexible canopy side 14 to the pipe fitting 10 means that toxic gases from the fumigation tent 16 will not pose any occupational health risk to operators of the fumigation apparatus during processing, while they may be standing alongside the area where the pipe fitting 10 accesses the fumigation tent 16.

The absorption process described in the present application represents an advancement over the exhaust gas incineration or dilution processes. Fumigation systems which can use fumigation reagents, such as methyl bromide, safely and in a way in which is non-toxic to the environment are of major interest worldwide.

Now that several preferred embodiments of the present invention have been described in some detail it would be apparent to those skilled in the art that the fumigation apparatus has at least the following advantages over the prior art:

1. The fumigation apparatus is adapted to be positioned under a flexible side wall of any enclosed space and thus is relatively convenient and uncomplicated to fabricate;
2. The fumigation apparatus is relatively effective in fumigating products; and
3. The fumigation apparatus is "environmentally friendly" and operationally safe in its fumigation and absorption of the fumigant.

Effective fumigation of products by skilled operators using this apparatus and method can provide for the safe treatment of material in situ at a wharf or factory site, and may eliminate the possibility of insects or vermin escaping into the environment, or being transported across the country in contaminated produce, along with enhanced health, safety and environmental benefits.

Those skilled in the art will appreciate that the invention described herein is susceptible to variations and modifications other than those specifically described. For example, the invention need not be restricted to methyl bromide as the fumigant but rather extends to any substance which is suitable in fumigating produce and thus killing pests, parasites, insects, or vermin. The portal apparatus may need not be restricted to the specific shape or constructional features described.

All such variations and modifications are to be considered within the scope of the present invention the nature of which is to be determined from the foregoing description.

It is to be understood that, if any prior art information is referred to herein, such reference does not constitute an admission that the information forms a part of the common general knowledge in the art, in Australia or any other country.

The claims defining the invention are as follows:

1. A method of installing a fumigant gas port in a fumigation chamber which at least in part incorporates a flexible canopy, the gas port adapted to be seated on an underlying structure and arranged to be positioned between the canopy and the underlying structure, and where the gas port comprises:
   a barrier having an enlarged central portion such that the barrier reduces in height moving from the central portion to at least one of opposite edge portions;
   at least one of a fumigant gas inlet or outlet disposed in the barrier, the inlet to allow a flow of a fumigant into the fumigation chamber and the outlet to allow the removal of a flow of fumigant from the fumigation chamber; and
   a sealing surface extending along an outer periphery of the barrier between said opposite edge portions, the sealing surface adapted to be contactable with the flexible canopy to provide a gas-tight seal between said apparatus and said canopy
   wherein the method comprises the steps of:
   disposing the gas port between the flexible canopy and the underlying structure; and
   retaining a lower edge margin of the flexible canopy in contact with the sealing surface of the gas port to form a gas tight-seal therebetween.

2. A method according to claim 1, further comprising the step of:
   locating weights on the lower edge margin of the canopy to retain that edge margin in contact with the sealing surface.

3. A method according to claim 1 further comprising the steps of:
   providing a smooth transition region between opposite sides of the portal apparatus and the underlying structure; and
   retaining the lower edge margin of the canopy in contact with the transition region to cause a gas-tight seal across that transition region.

4. A method according to claim 3 further comprising the steps of:
   locating weights on the lower edge margin of the canopy to retain that lower edge margin in contact with the transition region.

5. A method of fumigating a product located in a fumigation chamber, the method including the steps of:

providing an inlet and outlet port in the fumigation chamber, wherein at least one of said ports is installed using a method according to claim 1;

operatively coupling fumigant introduction and extraction apparatus to with the portal apparatus;

fumigating the product by providing a flow of a fumigant to the fumigation chamber via the inlet port; and extracting a flow of the fumigant from the fumigation chamber via the outlet port.

6. A method of fumigating a product as claimed in claim 5 further comprising the steps of:

providing control apparatus for at least one of the fumigant introduction and extraction apparatus; and controlling at least one of the flow of fumigant introduced into, or extracted from, the port(s) under operation of the control apparatus.

7. A method of fumigating a product as claimed in claim 6 wherein the control apparatus used is a valve assembly.

8. A method of fumigating a product as claimed in claim 5 further comprising the step of supplying a flow of fumigant in direct association with a heating source, the latter used to convert the fumigant into a gaseous form.

9. A method of fumigating a product as claimed in claim 8 wherein the heating source used is located inside the fumigation chamber in use.

10. A method of fumigating a product as claimed in claim 8 wherein the fumigant is supplied from a mobile fumigant source.

11. A method of fumigating a product as claimed in claim 5 further comprising the step of dispersing the fumigant in the fumigation chamber by a dispersion pipe system in use located around the product to circulate fumigant and gases.

12. A method of fumigating a product as claimed in claim 5 wherein the step of extracting the flow of fumigant is accomplished by use of a contra-rotating fan.

13. A method of fumigating a product as claimed in claim 5 wherein the step of extracting the flow of fumigant is followed by the step of producing a stripped gas by absorbing the fumigant using an absorption apparatus operatively coupled to the extraction apparatus, the absorption apparatus being designed to absorb substantially all of the fumigant extracted from the fumigation chamber.

14. A method of fumigating a product as claimed in claim 13 wherein the absorption apparatus comprises an absorption bed including activated carbon to which at least part of the extracted fumigant attaches.

15. A method of fumigating a product as claimed in claim 13 further comprising the step of providing a flow of the stripped gas into the fumigation chamber via the portal apparatus.

16. A method of fumigating a product as claimed in claim 5 wherein the method further comprises the step of controlling a flow of an inlet gas to selected parts of the fumigation chamber.

17. A method of fumigating a product as claimed in claim 16 wherein the step of extracting the flow of fumigant is followed by the step of producing a stripped gas by absorbing the fumigant using an absorption apparatus operatively coupled to the extraction apparatus, the absorption apparatus being designed to absorb substantially all of the fumigant extracted from the fumigation chamber, and wherein the inlet gas is either the fumigant or a displacement gas.

18. A method of fumigating a product as claimed in claim 17 wherein the displacement gas is the stripped gas.

19. A method of fumigating a product as claimed in claim 16 wherein the step of controlling the flow is by the operation of a flow control apparatus comprising a manifold and a valve assembly.

20. A method of fumigating a product as claimed in claim 19 wherein the manifold has a plurality of outlets and wherein the valve assembly is arranged to control the flow through at least one of the outlets.

21. A method of fumigating a product as claimed in claim 5 further comprising the step of using a monitoring apparatus to monitor the concentration of fumigant in the fumigation chamber wherein the monitoring apparatus comprises a fumigant sampling and detection meter unit operatively coupled to an outlet of the portal apparatus.

\* \* \* \* \*

UNITED STATES PATENT AND TRADEMARK OFFICE
CERTIFICATE OF CORRECTION

PATENT NO. : 7,910,056 B2
APPLICATION NO. : 11/885466
DATED : March 22, 2011
INVENTOR(S) : Serguei Ivanine It is certified that error appears in the above-identified patent and that said Letters Patent is hereby corrected as shown below:

Column 1, line 38 (application page 2, line 3), after "provides a", insert --fumigation chamber--.

Column 1, lines 47-50 (application page 2, lines 12-18), delete: "at least one of a fumigant gas inlet or outlet disposed in the barrier, the inlet to allow a flow of a fumigant into the fumigation chamber and the outlet to allow the removal of a flow of fumigant from the fumigation chamber; and", insert --at least one of a single gas inlet pipe and a single gas outlet pipe, the or each pipe disposed to pass entirely through the barrier whilst maintaining a gas-tight seal across the barrier such that in use the inlet pipe allows a flow of a fumigant into the fumigation chamber and the outlet pipe allows the removal of a flow of fumigant from the fumigation chamber; and--.

Column 2, lines 38-45 (application page 4, lines 11-31), after "inlets or outlets.", delete: "In some forms, the fumigant inlet(s) or outlets(s) comprise(s) a pipe which passes entirely through the barrier to allow fluid communication between either side of the barrier. In a second aspect the present invention provides a fumigation assembly including the apparatus of the first aspect and a fumigation chamber incorporating at least in part a flexible canopy." and insert:
--In a second aspect the present invention provides a fumigation assembly including:
(a) a fumigation chamber incorporating at least in part a flexible canopy, and
(b) a portal apparatus adapted to be seated on an underlying structure and arranged to be positioned between the canopy and the underlying structure, the apparatus comprising:
a barrier having an enlarged central portion such that the barrier reduces in height moving from the central portion to one of opposite edge portions;
at least one of a fumigant gas inlet or outlet disposed in the barrier, the inlet to allow a flow of fumigant into the fumigation chamber and the outlet to allow the removal of a flow of fumigant from the fumigation chamber; and
a sealing surface extending along an outer periphery of the barrier between said opposite edge portions, the sealing surface adapted to be contactable with the flexible canopy to provide a gas-tight seal between said apparatus and said canopy.--.

Signed and Sealed this
Twenty-ninth Day of November, 2011

David J. Kappos
*Director of the United States Patent and Trademark Office*

CERTIFICATE OF CORRECTION (continued)

Column 2, line 49 (application page 5, lines 4-7), after "a flexible canopy.", insert:
--In some embodiments, the or each fumigant inlet(s) or outlet(s) may comprise a pipe which passes entirely through the barrier to allow fluid communication between either side of the barrier.--.

Column 2, lines 52-58 (application page 5, lines 11-33), after "flexible canopy", delete "the method comprising the steps of:
disposing a portal apparatus according to the first aspect between the flexible canopy and the underlying structure; and
retaining a lower edge margin of the flexible canopy in contact with the sealing surface of the portal apparatus to form a gas tight-seal therebetween." and insert:
--the gas port adapted to be seated on an underlying structure and arranged to be positioned between the canopy and the underlying structure, and where the gas port comprises:
a barrier having an enlarged central portion such that the barrier reduces in height moving from the central portion to one of opposite edge portions;
at least one of a fumigant gas inlet or outlet disposed in the barrier, the inlet to allow a flow of fumigant into the fumigation chamber and the outlet to allow the removal of a flow of fumigant from the fumigation chamber; and
a sealing surface extending along an outer periphery of the barrier between said opposite edge portions, the sealing surface adapted to be contactable with the flexible canopy to provide a gas tight seal between said apparatus and said canopy
wherein the method comprises the steps of:
disposing the gas port between the flexible canopy and the underlying structure; and
retaining a lower edge margin of the flexible canopy in contact with the sealing surface of the gas port to form a gas-tight seal therebetween--.

Column 4, lines 36-39 (application page 10, lines 1-10), delete "In a sixth aspect, the present Invention provides an assembly arranged to operatively couple each of a gas extraction, treatment and recirculation apparatus in selective fluid communication, the assembly comprising:", and insert:
--In a sixth aspect, the present invention provides a fumigation system comprising:
(a) a fumigation chamber;
(b) gas extraction apparatus;
(c) gas treatment apparatus;
(d) gas recirculation apparatus; and
(e) an assembly arranged to operatively couple each of the gas extraction, treatment and recirculation apparatus in selective fluid communication, the assembly comprising:--.

Column 4, line 41 (application page 10, line 12), "a gas source" should be --the fumigation chamber--.

CERTIFICATE OF CORRECTION (continued)
U.S. Pat. No. 7,910,056 B2

Column 4, line 61 (application page 11, line 1), after "form", insert --of the fumigation system--.

Column 4, line 66 (application page 11, line 7), after "embodiments", insert --of the fumigation system.--.

Column 5, lines 2-3 (application page 11, lines 11-20), after "fumigation chamber", insert: --which at least in part incorporates a flexible canopy, the method comprising the steps of:
   seating one or more gas portal(s) on an underlying structure so that the or each portal is arranged to be positioned between the canopy and the underlying structure, the portal(s) having at least one of a fumigant gas inlet or outlet, the inlet to allow a flow of a fumigant into the fumigation chamber and the outlet to allow the removal of a flow of fumigant from the fumigation chamber;--.

Column 5, line 5 (application page 11, lines 22-23), "fumigation chamber;" should be --gas portal(s);--.

Column 5, lines 28-34 (application page 11, line 16), delete "In some embodiments of the method of the seventh aspect, at least one of the inlet and outlet can be installed in the fumigation chamber using a method as claimed in the third aspect.
   Some embodiments of the method of the seventh aspect utilise the assembly as defined in any one of the fifth or sixth aspects.".

Column 6, line 23 (application page 12, lines 23-24), "when fumigant" should be --fumigant when--.

Column 6, line 30 (application page 12, line 30), after "of" delete "the".

Column 7, line 65 (application page 16, line 10), after "or", delete "a".

Column 7, line 65 (application page 16, line 10), "projects" should be --project--.

Column 8, line 17 (application page 16, line 30), delete second occurrence of "between the".

Column 9, line 38 (application page 19, line 27), after "have", delete "a".

Column 9, line 48 (application page 20, line 5), after "gas", insert --from--.

Column 12, line 44 (application page 26, line 22), after "another", delete "a".

Column 15, line 5 (application page 16, line 57), after "apparatus", delete "to".

UNITED STATES PATENT AND TRADEMARK OFFICE
CERTIFICATE OF CORRECTION

PATENT NO.        : 7,910,056 B2
APPLICATION NO.   : 11/885466
DATED             : March 22, 2011
INVENTOR(S)       : Serguei Ivanine et al.

Page 1 of 1

It is certified that error appears in the above-identified patent and that said Letters Patent is hereby corrected as shown below:

Front Page, Assignee:, "Asia World Shipping Services Pty Ldt." should be
--Asiaworld Shipping Services Pty Ltd.--

Signed and Sealed this
Fourteenth Day of February, 2012

David J. Kappos
*Director of the United States Patent and Trademark Office*